March 27, 1951  P. MODIGLIANI  2,546,230
GLASS PRODUCT AND METHOD OF MAKING THE SAME
Filed Oct. 10, 1947  2 Sheets-Sheet 2

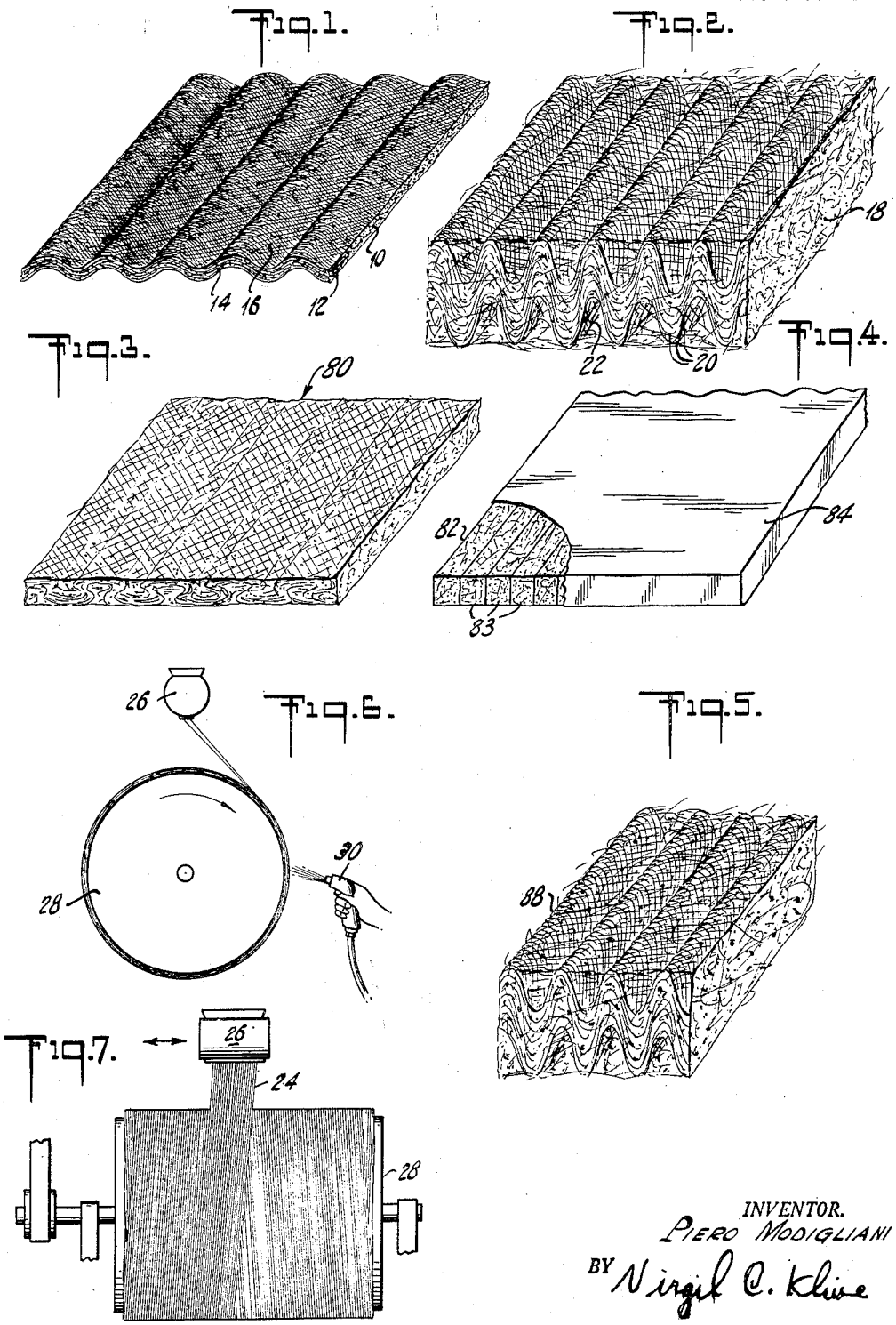

INVENTOR.
PIERO MODIGLIANI
BY Virgil E. Kline
ATTORNEY

Patented Mar. 27, 1951

2,546,230

UNITED STATES PATENT OFFICE 2,546,230

GLASS PRODUCT AND METHOD OF MAKING THE SAME

Piero Modigliani, Manhasset, N. Y., assignor to Johns-Manville Corporation, New York, N. Y., a corporation of New York Application October 10, 1947, Serial No. 779,000

16 Claims. (Cl. 154—92)

The instant invention relates to improved products made from continuous or substantially continuous glass filaments and to the production of such products. The application is a continuation in part, as to common subject matter, of my co-pending application, S. N. 751,481, filed May 29, 1947, where I have described and claimed improved filamentary glass fabrics or products, and their method of production, the products exhibiting unusual flexibility and stretchability as compared to known products of the same general kind. The instant invention is particularly concerned with further developments in this type of product and has for its principal object the provision of expanded glass, multi-layer bodies in which the several layers assume substantially corrugated or undulatory configurations. In one form of the product the corrugations or undulations are pronounced on both surfaces, the product comprising essentially a corrugated sheet composed of substantially continuous glass fibers. In another embodiment of the invention the product is expanded or puffed in the direction of its thickness and the corrugations are submerged in the general mass of the body to such an extent that a relatively thick but firm, lightweight, low density product is obtained. The invention also contemplates a product of higher density resulting from the compression of the aforementioned low density product.

A further object of the invention is the provision of products of the type mentioned above containing fillers of any suitable type for the purpose of increasing the heat insulating efficiency or otherwise improving the properties of the products.

A still further object of the invention is the provision of a product comprising the low density material referred to above maintained under compression by forces applied transversely of the corrugations and in a direction at approximately right angles to the height of the corrugations.

A still further object of the invention is the provision of a method of producing the products referred to above.

My invention will be more fully understood and further objects and advantages thereof will become apparent when reference is made to the more detailed description of a preferred embodiment of the invention which is to follow and to the accompanying drawings in which:

Fig. 1 is a perspective view of a segment of a corrugated product in accordance with the instant invention;

Fig. 2 is a perspective view, similar to Fig. 1, illustrating a puffed or expanded product;

Fig. 3 is a perspective view of a segment of a product such as shown in Fig. 2 but in compressed condition;

Fig. 4 is a perspective view of a segment of a product composed of strips of the material disclosed in Fig. 2 rotated through an angle of 90° and compressed;

Fig. 5 is a perspective view of a segment of a product such as shown in Fig. 2 containing a distributed filler material;

Fig. 6 is a diagrammatic, end elevational view of an apparatus employed in the instant invention for carrying out certain steps of the method thereof;

Fig. 7 is a front, elevational view of the apparatus of Fig. 6;

Figure 8:
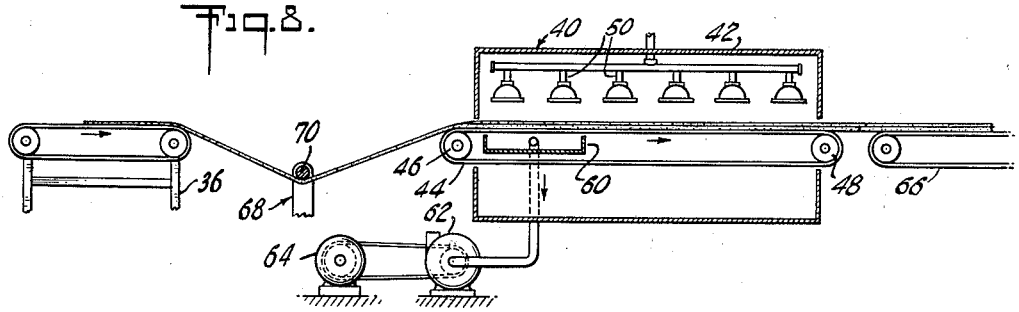
Fig. 8 is a diagrammatic, elevational view of apparatus employed for further operations in the instant method.

Referring now to the drawings, one product of the instant invention consists of a fabric or body 10 composed of a plurality of layers 12 each formed of continuous or substantially continuous glass filaments 14. The filaments of each layer lie in approximate parallelism and the filaments of adjacent layers cross each other at relatively acute angles. Each layer of the filaments is of corrugated or undulatory form and, in this embodiment the corrugations are relatively open and the layers are in closely adjacent nesting relationship whereby the product as a whole is in the form of a corrugated sheet as illustrated. Intermingled with the filaments is a relatively minor proportion, with respect to the bulk of the product, of a cured or hardened binder; the proportion of the binder being, say, between 0.2 and 50% by weight of the product. It will be understood that Fig. 1, and other illustrations of the products as well, are diagrammatic and that in actual practice the binder 16 will be visually insignificant.

In Fig. 2 a further embodiment of the product is shown. In this case the general construction of the fibrous body or product 18 is the same as before in that it is composed of a plurality of corrugated layers 20 of continuous glass filaments with the filaments of each layer lying in approximate parallelism and the filaments of adjacent layers crossing each other at preferably relatively acute angles. The product is, however, expanded or puffed in the direction of its thickness to produce very lightweight, low density material. In the expanding or puffing operation the corrugations are brought into closely adjacent, lateral relationship and laterally compressed or narrowed with consequent increase in their height. At the same time, the several layers are somewhat separated although tied together by a multiplicity of interconnecting filaments. As in the case of the product of Fig. 1, a minor proportion of a binder, say, 0.2 to 50% by weight of the product, is intermingled with the fibers to maintain the integrity of the product. The specks of binder are diagrammatically illustrated at 22.

The products described above are adapted for many uses. The corrugated material of Fig. 1 finds a particular field of use as a filter element in gas filtration systems. It may also be used for decorative purposes, as a thermal insulating material and the like. The product of Fig. 2 is very light-weight and may have a density as low as, say, one-tenth of a lb. per cu. ft. It is extremely resilient and serves admirably as a packing material for fragile articles. It also may be used for decorative purposes, as a lightweight padding or filler and as a filter element. In compressed form, later to be described, it is an effective low density thermal and sound insulating material. Both products referred to above find a further field of use as plastic reinforcements.

Referring now particularly to Figs. 6-9 inclusive, the method employed to produce the products described above will be explained in detail. The products are made from an initial mat known as the "condensed" mat fabricated in a substantially conventional manner (see Figs. 6 and 7), by drawing a plurality of continuous glass filaments 24 directly from the spinning orifices of a melting furnace 26 and accumulating the filaments on a drum 28. The drawing drum 28 is rotated, in the direction indicated by the arrow in Fig. 6, by any suitable driving means (not shown) and at a relatively high speed to continuously draw fine filaments, say of 6 to 40 micron diameter, and wind the filaments on the drum. Either the furnace or the drum is reciprocated to lay the glass filaments on the drum in a plurality of layers of spirals with the filaments of each layer crossing the filaments of adjacent layers. In the apparatus illustrated, the furnace 26 is reciprocated, as indicated by the double ended arrow in Fig. 7. The rate of reciprocation relatively to the drawing speed, that is, the rotational speed of the drum, is such that the filaments of adjacent layers cross each other at acute angles.

In accordance with applicant's process, a binder may be applied during the filament drawing operation. This application may be made in any suitable way, for example, by a manually operated spray device 30 (see Fig. 6) which is moved back and forth across the mat on the drum at intervals to uniformly spray the binder material onto the mat. The amount of binder used is carefully controlled. As will be later explained in greater detail, only a portion of the total binder content, preferably say, up to 70% of the binder content, is applied at this stage, the remainder of the binder being applied to the mat during later stages in the formation of the product. The total binder applied is such that the solids binder content of the finished product is from 0.2 to 50% by weight of the product.

The binder is preferably employed in the form of an emulsion, a water dispersion being suitable. However, a solution of the binder in a solvent is also satisfactory. The binder may be either thermo-setting or thermo-plastic, but thermo-setting adhesives are preferred. Examples of suitable adhesives are acrylic resins, urea-formaldehyde resins, phenol formaldehyde resins, polyvinyl alcohols, latex and the like. In commercial operations, it has been found preferable to apply a water dispersion of an acrylic resin during the filament drawing operation and a dispersion of a urea-formaldehyde resin at the later stage. Due to the relatively high speed movement of the mat carried on the drum and the temperatures prevalent during the filament drawing operation, the binder rapidly dries by evaporation of the water or solvent, as the case may be, so that, upon completion of the drawing operation, the mat contains a substantially dry but unset binder.

Alternatively to applying the initial portion of the binder during the mat drawing operation, it may be sprayed or brushed on the mat after removal of the same from the drum and then permitted to air dry. If desired, a wetting agent or other conventional means may be used to insure penetration of the binder throughout the mat.

Figure 9:
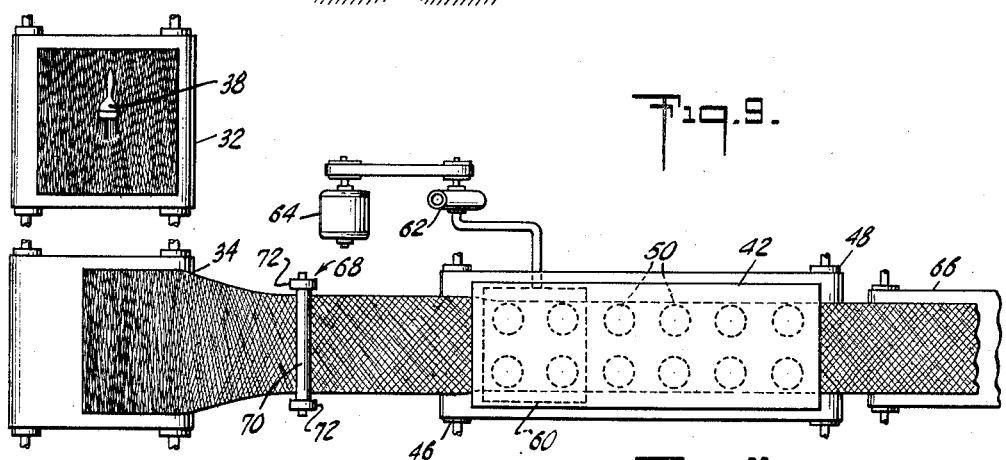
Fig. 9 is a diagrammatic, plan view of the apparatus of Fig. 8.

Referring now particularly to Figs. 8 and 9, when the condensed mat is completed, it is placed on one of, suitably, a number of conveyors 32 and 34, the mat being placed so that the filament direction is generally transverse of the conveyor, as illustrated in Fig. 9; that is, the dimension of the mat measured by the circumference of the drum extends transversely of the conveyor. A pair, or multiple pairs, of conveyors may be employed to permit the mats to be prepared for subsequent operations while a previously treated mat is being expanded by apparatus to be described later. The conveyors are supported on movable platforms 36 so that they may be moved laterally into alignment with the expanding mechanism. This arrangement permits a substantially continuous operation to be maintained. As soon as expansion of a mat is completed, the tables are shifted to move the treated mat into position for the expansion operation.

While the condensed mat is on the conveyor, for example on conveyor 32, it is first treated with a binder softener. In the case of a binder such as the preferred acrylic resin, the softener is water which, in effect, again places the finely divided binder in suspension. If binders are employed of the type which cannot be practically softened with water, an appropriate solvent is used. The softener may be applied to the mat by spraying it or a hand brush, illustrated at 38, may be employed for the purpose. As pointed out above, preferably, although not necessarily, only a portion of the total binder content is applied to the condensed mat during the winding operation. Where this practice is followed, the remainder of the binder is applied at this time. The added binder may be the same as that already used but suitably is a material such as a urea-formaldehyde resin. This material in the form of a suspension is spread on the mat on the conveyor either by spraying, hand brushing, brush roll application, or the like, similarly as the softener. When the mat has been treated as described above, it is allowed to stand for an appreciable length of time, say 10 to 30 minutes, to permit thorough soaking of the mat by the applied softener and binder. The relatively slow expanding operation allows ample time for the soaking period.

After the mat has been prepared as described above, and the machine is ready to receive it, the conveyor is moved laterally into a position in line with the expanding device and oven indicated generally at 40. The same apparatus may be employed for the production of the products shown in both Figs. 1 and 2, the character of the product being determined by the degree of expansion imparted to the original condensed mat, as will be hereinafter explained. The apparatus 40 and its appurtenances consist of an oven or drying chamber 42 including a conveyor 44 mounted on pulleys 46 and 48, respectively, for movement in the direction indicated by the arrow by any suitable driving means (not shown). The conveyor is of open gas pervious construction and suitably may be made of wire mesh material, such as hardware cloth. Means are provided to heat the material carried by the conveyor, the heating means in the construction illustrated comprising a plurality of series of infra red ray lamps 50 supported above the upper run of the conveyor to direct their rays toward the conveyor. The conveyor and heating means are suitably enclosed in an insulated housing 52.

Beneath the upper run of the conveyor and located within the rear section thereof is a suction box 60 connected to any suitable source of suction, such as blower 62, driven by a motor 64. Forwardly of conveyor 48 a run-out or a cutting table 66 is located. This may be a conveyor, as illustrated, or any other suitable device for receiving the material from the oven. Also, if desired a rolling or packaging device of conventional type may be used at this location.

Between the oven conveyor and the feed conveyor 32 or 34, as the case may be, a tensioning device 68 is provided, suitably consisting of a roller 70 carried by anti-friction bearings in supports 72. The tensioning device is located either below or above the path of travel of the material from the table to the oven conveyor.

In the operation of the above described apparatus, the condensed mat on the feed conveyor is grasped at the forward edge and is pulled out or expanded into an elongated web which is passed beneath tension bar 70 and carried onto conveyor 44 where the end is temporarily secured in any suitable manner, for example, by weighting it. Conveyor 44 is then driven in the direction indicated by the arrow to continuously draw or expand the mat supplied from the feed conveyor, the latter conveyor being operated either automatically or manually, preferably the latter, at a greatly reduced speed as compared to the speed of travel of conveyor 44, to move the condensed mat forwardly as its forward end is drawn or expanded into the web traveling to the oven. Blower 62 is operated to exert suction through the conveyor 44 at the location of suction box 60, and the heating means, such as the infra red ray lamps 50 are turned on to raise the temperature at the location of the upper run of the conveyor to such degree as to set and harden the binder carried by the web during the travel of the web through the oven.

It has been found that when the oven conveyor is driven at a speed to expand the condensed mat to, say, above 40 times its original length, the web first narrows, as illustrated in Fig. 9, and the filaments of the several layers shift or slide to change from directions substantially transversely of the mat or web to positions at, say, a 45° angle, or greater, to the transverse dimension of the web to lie in what is here termed a direction "generally longitudinally" of the web. After this original longitudinal expansion and transverse narrowing of the mat takes place, the continued pull on the mat causes the several layers of the mat to form into a series of longitudinally extending, substantially parallel corrugations. Where the expansion of the mat is between, say, 20 and 30 times its original length the corrugations remain relatively open and the layers in closely adjacent relationship. As the corrugated web is carried through the oven, the water or solvent is removed as the web moves through the rear section of the oven and over the suction box, and the binder is then set or hardened to bond the filaments together so that a product as illustrated in Fig. 1 is produced. The extent to which the original mat must be expanded or stretched to produce the particular desired effect will depend for the most part on the original weight and character of the mat and the relative speed of the oven conveyor to the feed conveyor. The width of the expanded mat of the desired characteristics should be noted and thereafter the relative speeds adjusted to keep this width at the same value, as the narrowing of the mat has been found to be directly correlated to the extent of stretch or expansion and, hence, the character of the corrugations formed.

Where a product as disclosed in Fig. 2 is desired, the operations are identical, as previously mentioned, except that the amount of stretching or expansion is increased to, say, from 20 to 50 times the original length of the mat. In this case a further narrowing of the mat occurs and the corrugations move into closely, laterally adjacent relationship and the mat puffs or expands in the direction of its thickness to produce a puffed up, extremely lightweight, low density product in which the several filamentary layers retain their corrugated contour but move apart, although still tied together by numerous interlocking filaments and by binder particles. The surfaces of the product are relatively smooth and the corrugated appearance is subdued due, apparently, to the close, lateral adjacent relationship of the corrugations and their submergence in the general mass of the product. The degree of puffing or expansion is determined by the degree of longitudinal stretching or expansion of the mat and its consequent reduction in width.

Figure 11:
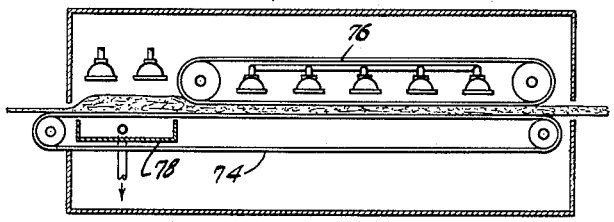
Fig. 11 is a diagrammatic view of a modified form of the oven construction; and, Fig. 12 is a diagrammatic view of a further modification of the apparatus.
Figure 12:
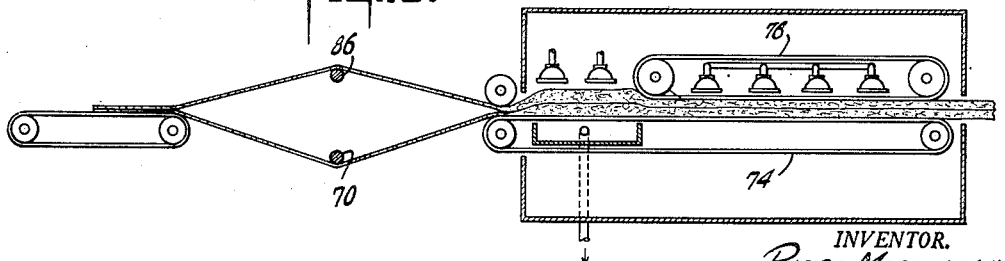

Products made as described above, particularly the puffed or expanded material, may be modified in a number of ways to increase their fields of use. For example, the puffed material is of a too open, porous structure and of too low a density to be effective as a thermal or sound insulating material. To increase its density, say, to a density of ¾ lb. to 2½ lbs. per cu. ft., but without destroying its relatively uniform porous character, the embodiment of the apparatus shown in Fig. 11 may be employed. In this case a slightly modified form of oven is provided consisting of a main conveyor 74 and an overlying compression conveyor 76 mounted in the oven forwardly of suction box 78. The other elements of the apparatus are the same is in the previous embodiment. The original, condensed mat is prepared as before and drawn from the feed table into the oven by conveyor 74 which is driven at sufficient rate relative to the rate of delivery of the mat to produce the puffed product. Before the binder has taken a final set, the puffed product is compressed between conveyor 74 and 76 and the final set of the binder is then achieved. The product, indicated by the reference character 80 is diagrammatically illustrated in Fig. 3. The product has a relatively uniform, porous structure and is of a predetermined density, within reasonable limits, the density being determined by the extent to which material was compacted in the oven.

Where a compressed, relatively dense mat such as shown in Fig. 3 is required to have a considerable thickness, a modification of the apparatus, as illustrated in Fig. 12, may be employed. In this modification two condensed mats are fed simultaneously from the feeding table, the mats being placed on the feeding table in superposed relationship. The lower of the mats is carried beneath tension device 72 as before and the upper mat is carried over a similar tension device 86, the two mats then being brought together on the oven conveyor. The oven in this case is identical with that shown in Fig. 11. In the operation both mats expand or puff up to secure a double thickness of the puffed mat. When they pass between the overlying conveyor 76 and main conveyor 74, they are compressed to the desired density and the binder set to secure a substantially unitary, relatively thick material.

As pointed out above, the puffed product is very resilient and compressible. It has been found that it is particularly elastic and resilient when subjected to compressive forces exerted edgewise of the material, that is, in a direction laterally of the corrugations and substantially in the plane of the layers or laminations making up the product. This property may be utilized to obtain an extremely resilient pad by cutting sections from a material such as shown in Fig. 2, rotating the sections through 90° and again assembling them in blanket or block form. One form in which such strips may be utilized is indicated in Fig. 4 where the product consists of a plurality of such strips 82 assembled in adjacent relationship with their cut edges forming the top and bottom surfaces of the product, the strips being maintained in adjacent relationship and under compression, if desired, by means of lines of adhesive between the strips, as indicated at 83 or an enclosing jacket 84 or both. A product of this type is extremely resilient and may find many fields of use as a packing material and the like.

Figure 10:
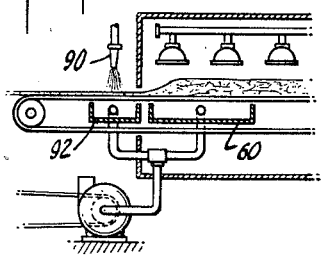
Fig. 10 is a diagrammatic, elevational view of an apparatus for performing certain steps in the method of making modified forms of the product.

It has been determined that in some instances it is desirable to introduce into the products in any of the forms disclosed above a suitable filling material such, for example, as asbestos fines, asbestos floats and the like to increase the insulating efficiency of the product or for other reasons. Such a product is illustrated in Fig. 5 where the filler material is distributed substantially uniformly throughout the body of the material as indicated at 88. A slight modification of the apparatus may be employed (see Fig. 10) to permit the introduction of the filler during the expansion and binder setting operation. In this embodiment rearwardly of the oven entrance and at a point overlying the oven conveyor, one or a series of spouts 90 is located to deliver the finely divided filler material to the upper surface of the web of the conveyor. Below the conveyor and in line with the spouts 90 is a suction box 92 connected to a suitable source of suction which may be the same as that used for suction box 60. The finely divided filler material is suitably pneumatically conveyed to the spouts from any suitable source of supply (not shown) and showered onto the mat before it enters the oven, the suction box serving to secure its distribution through the thickness of the mat.

The products described find many fields of usefulness due to their resilient, uniform characteristics. They are made of continuous or substantially continuous fibers or filaments and have substantial strength. The methods described for their production are simple and economical.

The puffed or expanded product has been found to have the ability to absorb liquids by capillarity without materially reducing its puffed up characteristics, i. e., without sagging or compacting. This property may be utilized for introducing impregnants or the like of any desired type. Also, a finely divided filler material may be included in the product by dispersing the filler in a liquid carrier and permitting the carrier to be absorbed into the product. The carrier may later be removed, for example by heat, to leave the distributed filler.

Having thus described my invention in rather full detail, it will be understood that these details need not be strictly adhered to but that various changes and modifications may suggest themselves to one skilled in the art, all falling within the scope of the invention as defined by the subjoined claims.

What I claim is:

1. The method comprising, forming a mat of a plurality of layers of filaments with the filaments extending generally transversely of the mat and with the filaments of adjacent layers crossing at acute angles, applying a minor proportion of an unset binder to the mat, drawing the mat in a direction at right angles to the general lay of the filaments until the layers of the mat assume a corrugated or undulatory form, and setting the binder.

2. The method comprising, forming a mat of a plurality of layers of filaments with the filaments extending generally transversely of the mat and with the filaments of adjacent layers crossing at acute angles, applying a minor proportion of an unset binder to the mat, drawing the mat in a direction at approximately right angles to the general lay of the filaments until the mat assumes a corrugated or undulatory form, and setting the binder while the mat is in such form.

3. The method comprising, forming a mat of a plurality of layers of filaments with the filaments extending generally transversely of the mat and with the filaments of adjacent layers crossing at acute angles, applying a minor proportion of an unset binder to the mat, drawing the mat in a direction at approximately right angles to the general lay of the filaments until the layers of the mat assume corrugated or undulatory forms and the mat expands in the direction of its thickness with the corrugations of each layer moving into contiguous relationship to provide a lightweight, low density, open, porous structure, and setting the binder.

4. The method comprising, forming a mat of a plurality of layers of filaments with the filaments extending generally transversely of the mat and with the filaments of adjacent layers crossing at acute angles and with a minor proportion of an unset binder distributed within the mat, applying a binder softener to the mat, drawing the mat in a direction substantially at right angles to the general lay of the filaments until the layers of the mat assume a corrugated or undulatory form, and setting the binder.

5. The method comprising, forming a mat of a plurality of layers of filaments with the filaments extending generally transversely of the mat and with the filaments of adjacent layers crossing at acute angles and with a minor proportion of a dried but unset binder distributed within the mat, applying additional binder to the mat, drawing the mat in a direction substantially at right angles to the general lay of the filaments until the layers of the mat assume a corrugated or undulatory form, and setting the binder.

6. The method comprising, forming a mat of a plurality of layers of filaments with the filaments extending generally transversely of the mat and with the filaments of adjacent layers crossing at acute angles and with a minor proportion of a dried but unset binder distributed within the mat, applying additional binder to the mat, drawing the mat in a direction at right angles to the general lay of the filaments until the layers of the mat assume corrugated or undulatory forms and the mat expands in the direction of its thickness with the corrugations of each layer moving into contiguous relationship to provide a lightweight, low density, open, porous structure, and setting the binder.

7. The method comprising, forming a mat of a plurality of layers of filaments with the filaments extending generally transversely of the mat and with the filaments of adjacent layers crossing at acute angles and with a minor proportion of a dried but unset acrylic resin distributed within the mat, applying a urea-formaldehyde resin to the mat, drawing the mat in a direction approximately at right angles to the general lay of the filaments, and setting the binder.

8. The method comprising, forming a mat of a plurality of layers of filaments with the filaments extending generally transversely of the mat and with the filaments of adjacent layers crossing at acute angles and with a minor proportion of a binder distributed therein, treating the mat with a binder softener and additional binder, drawing the mat in a direction at approximately right angles to the general lay of the filaments and heating the mat to remove the binder softener therefrom to expand the mat in the direction of its thickness, and setting the binder.

9. The method comprising, forming a mat of a plurality of layers of filaments with the filaments extending generally transversely of the mat and with the filaments of adjacent layers crossing at acute angles and with a minor proportion of a dried but unset binder distributed within the mat, applying a binder softener and additional binder to the mat, drawing the mat in a direction at approximately right angles to the general lay of the filaments, heating the mat and simultaneously passing a current of gas therethrough to remove the binder softener, and setting the binder.

10. The method comprising, forming a mat of a plurality of layers of filaments with the filaments extending generally transversely of the mat and with the filaments of adjacent layers crossing at acute angles, applying a minor proportion of an unset binder to the mat, drawing the mat in a direction approximately at right angles to the general lay of the filaments until the layers assume a corrugated or undulatory form, applying a finely divided filler to the mat during the drawing operation, and setting the binder.

11. In the method of forming an expanded product from a mat composed of a plurality of layers of substantially continuous glass filaments with the filaments extending generally transversely of the mat and with the filaments of adjacent layers crossing at acute angles, the mat having a minor proportion of an unset binder distributed therein, the steps comprising, applying a binder softener to the mat, drawing the mat in a direction at substantially right angles to the general lay of the filaments until the layers of the mat assume corrugated or undulatory forms and the mat expands in the direction of its thickness with corrugations of each layer moving into contiguous relationship, compressing the expanded mat, and setting the binder.

12. A product comprising a plurality of superposed layers of glass filaments with the filaments of adjacent layers in crossing relationship, the layers lying substantially parallel to one another and each layer having substantially uniform, parallel, contiguous undulations projecting above and below the median plane of the layer and extending at an angle to the filament directions, superposed layers being generally separate but tied together by a multiplicity of interconnecting filaments.

13. A product comprising a plurality of nested and superposed layers of glass filaments with the filaments of adjacent layers lying at divergent angles with respect to one another, the layers having the same geometric shape in the form of corrugations extending in one direction of the product, contiguous portions of each layer projecting respectively above and below the median plane of such layers and extending at an angle different from the angle formed by the filaments themselves, said superposed layers being generally separate but tied together by a multiplicity of interconnecting filaments.

14. A product comprising a plurality of superposed layers of glass filaments with the filaments of adjacent layers in intercrossed relationship, the layers lying substantially parallel to one another and each layer having substantially uniform, parallel, contiguous undulations projecting above and below the median plane of the layer and extending at an angle to the filament directions, superposed layers being generally separate but tied together by a multiplicity of interconnecting filaments, and a binder bonding said filaments into a substantially unitary body.

15. A product as defined by claim 14 having a finely-divided filler distributed among the filaments.

16. A product as defined by claim 14 which has been compressed and is held in its compressed state by the binder.

PIERO MODIGLIANI.

REFERENCES CITED

The following references are of record in the file of this patent:

UNITED STATES PATENTS

| Number | Name | Date |
|---|---|---|
| 2,081,060 | Modigliani | May 18, 1931 |
| 2,131,024 | Cordts | Sept. 27, 1938 |
| 2,234,986 | Slayter et al. | Mar. 18, 1941 |
| 2,287,815 | Modigliani | June 30, 1942 |
| 2,298,295 | Hyatt et al. | Oct. 13, 1942 |
| 2,409,951 | Nootens | Oct. 22, 1946 |
| 2,410,744 | Powers | Nov. 5, 1946 |
| 2,428,654 | Collins | Oct. 7, 1947 |
| 2,437,799 | Yorke | Mar. 16, 1948 |